United States Patent
Lu et al.

(10) Patent No.: US 9,275,306 B2
(45) Date of Patent: Mar. 1, 2016

(54) DEVICES, SYSTEMS, AND METHODS FOR LEARNING A DISCRIMINANT IMAGE REPRESENTATION

(71) Applicant: CANON KABUSHIKI KAISHA, Tokyo (JP)

(72) Inventors: Juwei Lu, Oakville (CA); Daruisz T. Dusberger, Irvine, CA (US); Bradley Scott Denney, Irvine, CA (US)

(73) Assignee: Canon Kabushiki Kaisha, Tokyo (JP)

(*) Notice: Subject to any disclaimer, the term of this patent is extended or adjusted under 35 U.S.C. 154(b) by 78 days.

(21) Appl. No.: 14/079,560

(22) Filed: Nov. 13, 2013

(65) Prior Publication Data
US 2015/0131899 A1    May 14, 2015

(51) Int. Cl.
*G06K 9/62*    (2006.01)
(52) U.S. Cl.
CPC .............. *G06K 9/6256* (2013.01); *G06K 9/626* (2013.01); *G06K 9/627* (2013.01); *G06K 9/62* (2013.01)
(58) Field of Classification Search
CPC . G06K 9/00288; G06K 9/6278; G06K 9/626; G06K 9/66; G06K 9/00369; G06K 9/00597; G06K 9/4642; G06K 9/6282; G06K 9/6292; G06K 9/6267; G06K 9/00684; G06K 9/6234; G06K 9/00147; G06K 9/6256; G06F 17/30722; G06F 17/30705; G06F 17/30731; Y10S 128/925; Y10S 707/99945; G06N 99/005; G06T 7/2033
USPC ......... 382/117, 118, 124, 159, 105, 170, 173, 382/195, 218, 224, 225
See application file for complete search history.

(56) References Cited

U.S. PATENT DOCUMENTS

| | | | |
|---|---|---|---|
| 6,751,363 B1* | 6/2004 | Natsev | G06K 9/522 358/403 |
| 7,054,468 B2* | 5/2006 | Yang | G06K 9/00275 345/16 |
| 8,194,938 B2 | 6/2012 | Wechsler | |
| 8,498,491 B1* | 7/2013 | Steffens | G06K 9/6292 382/224 |
| 8,923,607 B1* | 12/2014 | Kwatra | G06K 9/62 382/159 |

(Continued)

OTHER PUBLICATIONS

Mats Sjoberg et al., Indoor Location Recognition Using Fusion of SVM-Based Visual Classifiers, 2010 IEEE International Workshop on Machine Learning for Signal Processing.

(Continued)

*Primary Examiner* — Vu Le
*Assistant Examiner* — Aklilu Woldemariam
(74) *Attorney, Agent, or Firm* — Canon U.S.A., Inc. IP Division

(57) ABSTRACT

Systems, devices, and methods for generating an image representation obtain a set of low-level features from an image; generate a high-dimensional generative representation of the low-level features; generate a lower-dimensional representation of the low-level features based on the high-dimensional generative representation of the low-level features; generate classifier scores based on classifiers and on one or more of the high-dimensional generative representation and the lower-dimensional representation, wherein each classifier uses the one or more of the high-dimensional generative representation and the lower-dimensional representation as an input, and wherein each classifier is associated with a respective label; and generate a combined representation for the image based on the classifier scores and the lower-dimensional representation.

16 Claims, 9 Drawing Sheets

(56) References Cited

U.S. PATENT DOCUMENTS

| | | | |
|---|---|---|---|
| 2004/0117367 A1* | 6/2004 | Smith | G06F 17/30265 |
| 2007/0203904 A1* | 8/2007 | Ren | G06K 9/6292 |
| 2008/0063264 A1* | 3/2008 | Porikli | G06K 9/00369 382/159 |
| 2008/0063285 A1* | 3/2008 | Porikli | G06K 9/00369 382/190 |
| 2009/0006102 A1* | 1/2009 | Kan | G10L 25/00 704/500 |
| 2009/0257682 A1* | 10/2009 | Wang | G06K 9/3208 382/289 |
| 2009/0274434 A1* | 11/2009 | Mei | G06K 9/00711 386/278 |
| 2009/0299999 A1* | 12/2009 | Loui | G06F 17/30256 |
| 2010/0040285 A1* | 2/2010 | Csurka | G06K 9/00624 382/170 |
| 2010/0226564 A1* | 9/2010 | Marchesotti | G06F 17/30256 382/159 |
| 2010/0318532 A1* | 12/2010 | Sznajder | G06F 17/30858 707/759 |
| 2011/0085739 A1* | 4/2011 | Zhang | G06F 17/30265 382/218 |
| 2011/0135165 A1* | 6/2011 | Wechsler | G06K 9/6228 382/118 |
| 2011/0188713 A1* | 8/2011 | Chin | G06F 17/30247 382/118 |
| 2011/0293173 A1* | 12/2011 | Porikli | G06K 9/4642 382/159 |
| 2012/0131006 A1 | 5/2012 | Siddiqui | |
| 2012/0269441 A1* | 10/2012 | Marchesotti | G06N 99/005 382/195 |
| 2012/0288167 A1* | 11/2012 | Sun | G06K 9/00281 382/118 |
| 2013/0182909 A1* | 7/2013 | Rodriguez-Serrano | G06K 9/34 382/105 |
| 2014/0056511 A1* | 2/2014 | Lu | G06K 9/4676 382/159 |
| 2014/0093174 A1* | 4/2014 | Zhang | G06F 17/30259 382/190 |
| 2014/0161362 A1* | 6/2014 | Cao | G06K 9/6202 382/224 |
| 2014/0270350 A1* | 9/2014 | Rodriguez-Serrano | G06K 9/6217 382/103 |

OTHER PUBLICATIONS

Jun Yang et al., Evaluating Bag-of-Visual-Words Representations in Scene Classification, Proceedings of the international workshop on Workshop on multimedia information retrieval, 2007.

Andrew Zisserman, Bag of visual words model: recognizing object categories, International Computer Vision Summer School (ICVSS), 2008.

Florent Perronnin et al, Fisher Kernels on Visual Vocabularies for Image Categorization, CVPR 2007.

F. Perronnin et al., Large-scale image retrieval with compressed fisher vectors, CVPR, 2010.

Josef Sivic et al., Video Google: A Text Retrieval Approach to Object Matching in Videos, Proceedings of the Ninth IEEE International Conference on Computer Vision (ICCV 2003).

M. Douze et al., Combining attributes and Fisher vectors for efficient image retrieval, CVPR, 2011.

L. Yang et al., Unifying discriminative visual codebook generation with classifier training for object category recognition, IEEE Conference on CVPR, 2008.

Juwei Lu et al., Regularization studies of linear discriminant analysis in small sample size scenarios with application to face recognition, Pattern Recognition Letters 26 (2005) 181-191.

L. Torresani et al, Efficient object category recognition using classemes, European Conference on Computer Vision, 2010.

M. Naphade et al., Large-scale concept ontology for multimedia, IEEE Multimedia, vol. 13, No. 3, 2006.

H. Bay et al., "Surf: Speeded up robust features", ECCV 2006.

A. Berg et al., "ImageNet Large Scale Visual Recognition Challenge 2011," ILSVRC2011, 2011.

N. Dalal et al., "Histograms of oriented gradients for human detection", CVPR 2005.

R. E. Fan et al., "LIBLINEAR: A library for large linear classification", Journal of Machine Learning Research 9 (2008), 1871-1874.

D.G. Lowe, "Distinctive image features from scale-invariant keypoints", International Journal of Computer Vision, vol. 60, No. 2, 2004.

Juwei Lu et al, "Regularized Discriminant Analysis for the Small Sample Size Problem in Face Recognition", Pattern Recognition Letter, vol. 24, Issue 16, p. 3079-3087, Dec. 2003.

F. Moosmann et al, "Fast discriminative visual codebooks using randomized clustering forests", Advances in neural information processing systems, vol. 19, 2007.

T. Ojala et al, "Multiresolution gray-scale and rotation invariant texture classification with local binary patterns", IEEE Transactions on Pattern Analysis and Machine Intelligence, vol. 24, No. 7, pp. 971-987, 2002.

A. Oliva et al., "Modeling the shape of the scene: A holistic representation of the spatial envelope", International Journal of Computer Vision, vol. 42, No. 3, 2001.

Pattern analysis, statistical modeling, and computational learning (PASCAL) visual object classes (VOC) challenge, 2012.

L. Wang, "Toward a discriminative codebook: codeword selection across multi-resolution", IEEE Conference on CVPR, 2007.

W. Zhang et al., "Learning non-redundant codebooks for classifying complex objects", ACM International Conference on Machine Learning, 2009.

* cited by examiner

DEVICES, SYSTEMS, AND METHODS FOR LEARNING A DISCRIMINANT IMAGE REPRESENTATION

BACKGROUND

1. Technical Field

This description generally relates to visual analysis of images.

2. Background

In the field of image analysis, images are often converted to representations. A representation is often more compact than an entire image, and comparing representations is often easier than comparing entire images. Representations can describe various image features, for example scale-invariant feature transform (SIFT) features, speeded up robust (SURF) features, local binary patterns (LBP), color histogram (GIST), and histogram of oriented gradients (HOG) features. Representations include Fisher vectors and bag-of-visual features (BOV).

SUMMARY

In one embodiment a method comprises obtaining a set of low-level features from an image; generating a high-dimensional generative representation of the low-level features; generating a lower-dimensional representation of the low-level features based on the high-dimensional generative representation of the low-level features; generating classifier scores based on classifiers and on one or more of the high-dimensional generative representation and the lower-dimensional representation, wherein each classifier uses the one or more of the high-dimensional generative representation and the lower-dimensional representation as an input, and wherein each classifier is associated with a respective label; and generating a combined representation for the image based on the classifier scores and the lower-dimensional representation.

In one embodiment a method comprises generating a high-dimensional generative representation of low-level features of a query image; generating a lower-dimensional representation of the low-level features of the query image based on the high-dimensional generative representation; generating an attribute classifier score for the query image based on a classifier and on one or more of the high-dimensional generative representation of the query image and the lower-dimensional representation of the query image; and generating a comparison score for the query image and the reference image based at least on the lower-dimensional representation and on the attribute classifier score.

In one embodiment, a method comprises obtaining a low-level features from images in a set of images, where each image is associated with one or more labels; generating a high-dimensional representation based on the low-level features; generating a lower-dimensional representation based on the high-dimensional representation; generating a respective representation for each of the images in the set of images based on the lower-dimensional representation; and training a respective classifier for each of the one or more labels based on the respective label and on the respective representation of each of the images that are associated with the label.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods described herein.

Figure 1:
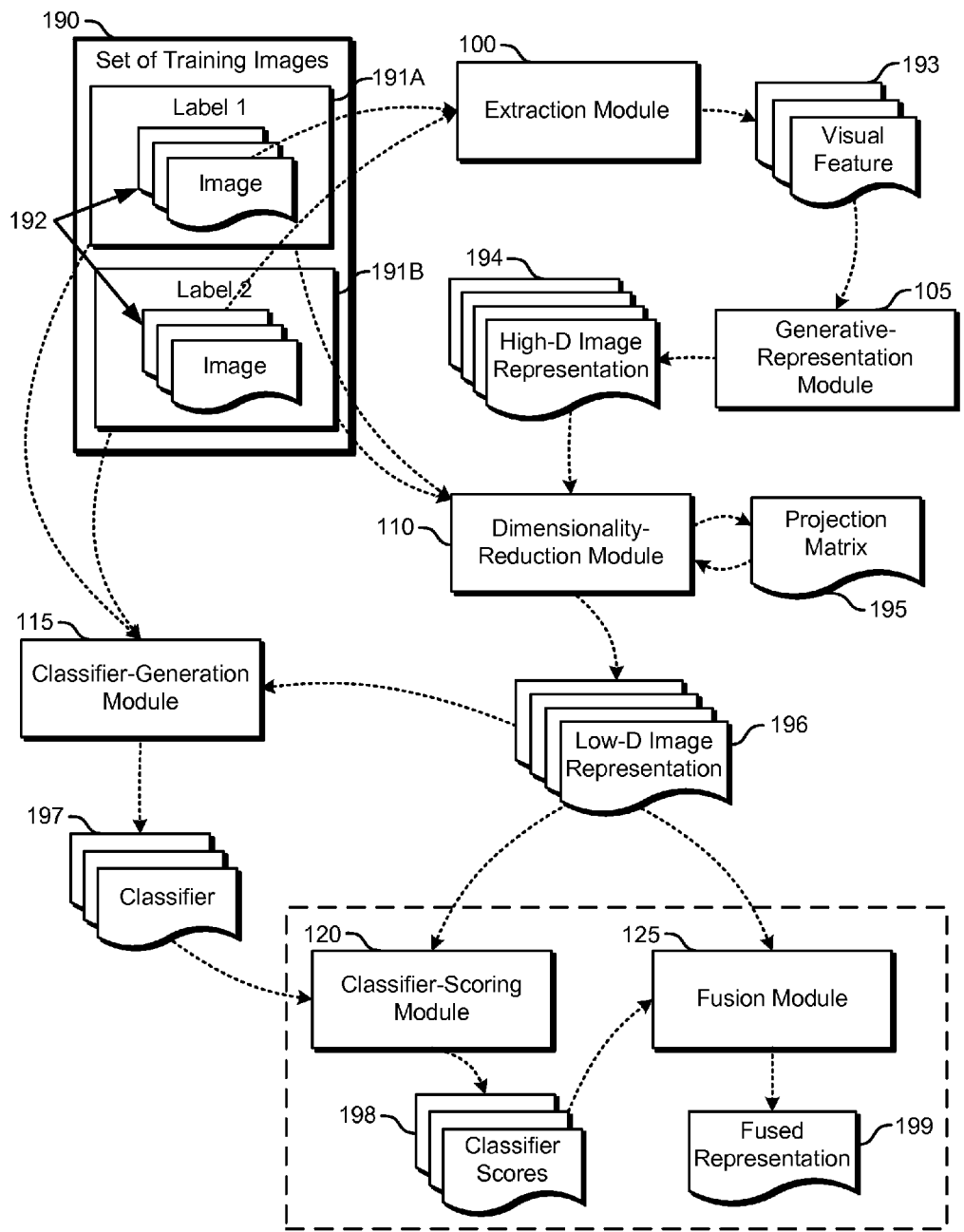
FIG. 1 illustrates an example embodiment of the operations that are performed by systems or devices that generate an image representation.

FIG. 1 illustrates an example embodiment of the operations that are performed by systems or devices that generate an image representation. The systems and devices use both generative and discriminant learning techniques. Though the systems and devices include other components, for purposes of explanation FIG. 1 shows only certain modules. Modules include logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the system includes additional or fewer modules, the modules are combined into fewer modules, or the modules are divided into more modules. Though the computing device or computing devices that execute a module perform the operations, for purposes of description a module may be described as performing one or more operations.

The generative-representation module 105 obtains a set of low-level visual features 193 that were extracted from images 192 in a set of training images 190, for example by an extraction module 100. The generative-representation module 105 generates a respective high-dimensional image representation 194 for each image 192 from the obtained low-level visual features 193. Embodiments of the high-dimensional image representation 194 include, for example, the BOV feature representation, locality-constrained linear coding, and the Fisher vector representation.

Next, the high-dimensional image representations 194 are sent to a dimensionality-reduction module 110, which generates a respective lower-dimensional image representation 196 for each image 192. Some embodiments of the dimensionality-reduction module 110 use a regularized linear discriminant analysis (R-LDA), which performs both discriminant feature extraction and dimensionality reduction. The dimensionality-reduction module 110 may generate a projection matrix 195 based on the obtained high-dimensional image representations 194 and may use the projection matrix 195 to generate the lower-dimensional image representations 196.

The lower-dimensional image representations 196 and category labels 191A-B are obtained by a classifier-generation module 115, which generates (e.g., trains, learns) a set of category classifiers 197. In some embodiments, the classification categories are used as attributes (e.g., glasses/no-glasses), and each attribute corresponds to a term or a category that is used to describe the image. The categories could be any terms from a vocabulary, for example the WordNet Ontology as used in ImageNet or a large-scale concept ontology for multimedia. Also for example, some embodiments learn the R-LDA classifiers or the SVM classifiers. Additionally, some embodiments of the classifier generation module 115, for example some embodiments that learn the SVM classifiers (or other non-R-LDA classifiers), obtain as inputs the high-dimensional image representations 194 in addition to, or in alternative to, the lower-dimensional image representations 196. Thus, not every embodiment includes the dimensionality-reduction module 110.

Some embodiments stop after generating the classifiers 197, for example some embodiments of systems designed to perform image classification. However, in some embodiments, a classifier-scoring module obtains the classifiers 197 and the lower-dimensional image representations 196 and generates with the classifier-scoring module 120, for each lower-dimensional image representation 196, a respective classifier score 198 for each classifier 197. Also, a fusion module 125 may obtain the classifier scores 198 and the lower-dimensional image representations 196 and generate, for each image 192, a respective fused representation 199 based on the classifier scores 198 and the lower-dimensional image representation 196 (or, in some embodiments, the high-dimensional representation 194) of the image 192.

The fusion module 125 obtains the classifier scores 198 and the lower-dimensional image representations 196 and performs feature and classifier fusion. The fusion module 125 creates the fused representation 199 by combining the lower-dimensional image representations 196 with the outputs of the classifier-scoring module, which are the classifier scores 198. In some embodiments, a late (e.g., online) fused representation 199 is equivalent to an early (e.g., offline) fused representation 199. As a result, the fusion may enhance search accuracy without increasing online computational complexity.

Finding a low-dimensional representation of a set of low-level features, for example SIFT features, that has enhanced discriminating power is useful in an image mining system. Some systems and devices learn a high-dimensional (often sparse) representation based on generative techniques, such as k-means and Gaussian Mixture Models (GMM). Also, some devices and systems use discriminant techniques. These devices and systems generally account for semantic information through supervised learning and characterize the information with attributes or higher-level concepts that encode the likelihood of a set of categories or objects being found in an image. Attributes describe a given object, for example "wheels", "green," etc. Attribute learning may lead to a lower-dimensional discriminant representation and may indicate the semantic information an image contains.

However, both generative and discriminant approaches have their own advantages and disadvantages. First, generative approaches are often easier to implement due to unsupervised learning and often more robust when dealing with test samples that have labels that were not seen during learning. However, they generally produce very high-dimensional representations, which are sometimes difficult to both store and search when using a large dataset and limited computing resources. Also, the generative approaches do not always take advantage of available image label information. Accordingly, from the BOV and Fisher vector representations, one cannot distinguish the between-class difference and the within-class difference. Thus, generative representations more powerfully capture the visual or feature level similarities between two images, rather than their semantic or label-level similarities.

On the other hand, discriminant approaches are often able to create more compact representations that are generally more discriminating when classifying samples from categories that have been learned. However, many discriminant representations are built on the outputs of a set of category classifiers, and they may over-abstract the semantic explanation of an image. Discriminant approaches may be more suitable to compare the semantic similarity between two images, rather than their visual similarity. Also, like other supervised-learning methods, the generalization performances of the discriminant approaches often degrade substantially when applied to samples that have labels that were not seen during training. However, the fused representation 199, which combines a lower-dimensional representation with the classification results, may provide the advantages of both the generative and discriminant approaches.

Figure 2:
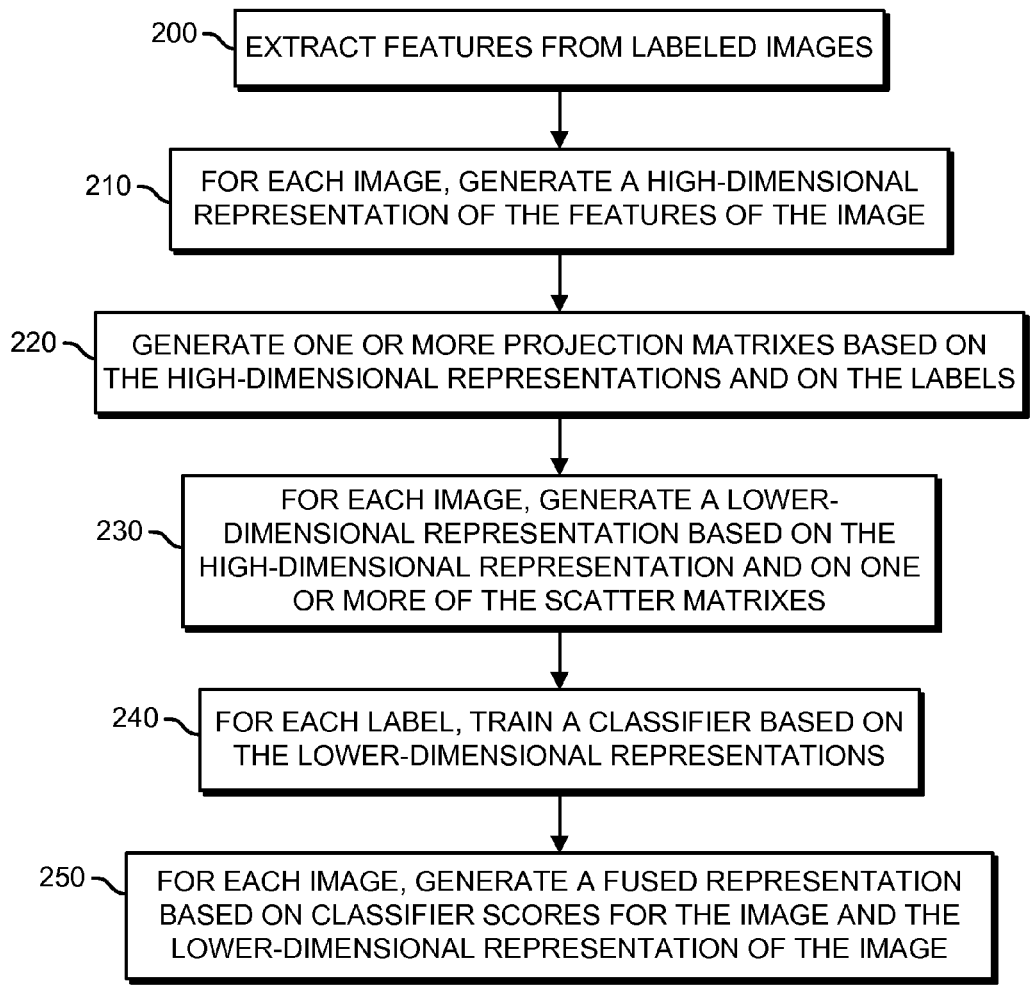
FIG. 2 illustrates an example embodiment of an operational flow for generating a fused representation.

FIG. 2 illustrates an example embodiment of an operational flow for generating a fused representation. The blocks of this operational flow and the other operational flows described herein may be performed by one or more computing devices, for example the systems and devices described herein. Also, although this operational flow and the other operational flows described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows described herein may omit blocks, add blocks, change the order of the blocks, combine blocks, or divide blocks into more blocks.

In block 200, features are extracted from labeled images (e.g., a training set). Labeled images are associated with one or more categories. Let $X=\{X_1, X_2, \ldots, X_N\}$ denote a set of N training images. Each image is represented by a set of visual features, $X_i=\{x_{i1}, x_{i2}, \ldots, x_{iJ_i}\}$, where $J_i$ denotes the number of the features extracted from the image $X_i$, and each feature $x_{ij} \in \mathbb{R}^D$ is a D-dimensional real vector. Let $y_i \in Y$ denote the label of the image $X_i$, where $Y=\{1, \ldots, C\}$ denotes the label set.

The flow then proceeds to block 210 where, for each image, a high-dimensional representation of the features of the image is generated. In block 210, a mapping is generated based on the images, for example according to $$F: X_i \rightarrow z_i = F(X_i) \in \mathbb{R}^M, \quad (1)$$

so that an image $X_i$ can be represented by a fixed-length vector $z_i$, where $\mathbb{R}^M$ denotes an M-dimensional real space.

Some embodiments use BOV, which quantizes the continuous D-dimensional space of image features into a vocabulary of M visual words. The BOV vocabulary may be learned by performing an unsupervised learning technique, for example k-means clustering with M clusters, on a training set. For each feature, its nearest visual word found in the vocabulary is selected to represent the feature.

Let $\Phi=\{\phi_1, \ldots, \phi_M\}$ denote M cluster centers obtained by performing k-means clustering on the training set X. In BOV, each cluster is treated as one visual word. Given a set of visual features extracted from an image, $X_i=\{x_{i1}, x_{i2}, \ldots, x_{iJ_i}\}$ the BOV representation of the image is a histogram over the vocabulary of visual words, $h_i = [h_{i1}, \ldots, h_{iM}]$ with each bin calculated according to the following:

$$h_{im} = \frac{1}{J_i} \sum_{j=1}^{J_i} \Delta\left(m - \underset{k \in [1,M]}{\operatorname{argmin}} d(\phi_k, x_{ij})\right), \quad (2)$$

with $\Delta(x) = \begin{cases} 1, & \text{if } x = 0 \\ 0, & \text{otherwise} \end{cases}$, where $d(\phi_k, x_{ij})$ is a distance measure (e.g., the Euclidean distance) between the feature $x_{ij}$ and the center $\phi_k$.

Also, some embodiments use Fisher vectors. A Fisher vector or Fisher kernel is a statistical feature-learning method. It is based on unsupervised learning; however, its learning focus is on capturing the difference between samples.

Let $p(x|\lambda)$ be the probability density function of the image features x with parameters $\lambda$. The Fisher vector considers the normalized gradient of the log-likelihood, $$F_\lambda^X = \Gamma_\lambda G_\lambda^X, \quad (3)$$

where $G_\lambda^X = \nabla_\lambda \log p(X|\lambda)$ is the gradient and $\Gamma_\lambda$ is a whitening matrix derived from the Fisher information matrix of $p(x|\lambda)$. In some embodiments, $p(x|\lambda)$ is a Gaussian mixture model (GMM):

$$p(x) = \sum_{i=1}^{M} w_i \cdot p_i(x | \mu_i, \Sigma_i), \quad (4)$$

where $w_i$, $\mu_i$, and $\Sigma_i$ respectively correspond to the weight, mean, and covariance matrix of the i-th Gaussian component, $$p_i(x | \mu_i, \Sigma_i) = (2\pi)^{-\frac{D}{2}} |\Sigma_i|^{-\frac{1}{2}} \exp\left(-\frac{1}{2}(x-\mu_i)^T \Sigma_i^{-1} (x-\mu_i)\right). \quad (5)$$

Assuming that $\Sigma_i = \operatorname{diag}[\sigma_{i,1}^2, \ldots, \sigma_{i,M}^2]$ is a diagonal matrix, mathematical derivations lead to the following Fisher vectors with respect to $w_i$, $\mu_i$, and $\Sigma_i$, respectively:

$$\mathcal{F}_{w_i}^X = \frac{1}{\sqrt{w_1 w_i (w_1 + w_i)}} \sum_{j=1}^{J_i} [w_1 \gamma_j(i) - w_i \gamma_j(1)], \text{ with } i \geq 2; \quad (6)$$

$$\mathcal{F}_{\mu_i}^X = \frac{1}{\sqrt{w_i}} \sum_{j=1}^{J_i} \gamma_j(i) \left(\frac{x_j - \mu_i}{\sigma_i}\right); \text{ and} \quad (7)$$

$$\mathcal{F}_{\sigma_i}^X = \frac{1}{\sqrt{2 w_i}} \sum_{j=1}^{J_i} \gamma_j(i) \left[\left(\frac{x_j - \mu_i}{\sigma_i}\right)^2 - 1\right], \quad (8)$$

where $\gamma_j(i)$ is the posterior probability of $x_j$, $$\gamma_j(i) = p(i | x_j, \lambda) = \frac{w_i \cdot p_i(x_j | \lambda)}{\sum_{m=1}^{M} w_m \cdot p_m(x_j | \lambda)}. \quad (9)$$

The final Fisher vectors $F_w^X, F_\mu^X, F_\sigma^X$ with respect to $w_i$, $\mu_i$, and $\Sigma_i$ are the concatenations of the $F_{w_i}^X, F_{\mu_i}^X, F_{\sigma_i}^X$ vectors for $i = 1, \ldots, M$:

$$F_w^X = [F_{w_2}^X, \ldots, F_{w_M}^X], a\ (M-1)\text{-dimensional vector}; \quad (10)$$

$$F_\mu^X = [F_{\mu_1}^X, \ldots, F_{\mu_M}^X], a\ (M \cdot D)\text{-dimensional vector}; \text{ and} \quad (11)$$

$$F_\sigma^X = [F_{\sigma_1}^X, \ldots, F_{\sigma_M}^X], a\ (M \cdot D)\text{-dimensional vector}. \quad (12)$$

Each vector may be further processed by L2 and square root normalizations. It can be seen from equation (6) that the mean Fisher vector $F_{w_i}^X$, is a soft-BOV representation: they both consider only 0-th order statistics (word counting). In addition, the other two Fisher vectors, $F_{\mu_i}^X$ and $F_{\sigma_i}^X$, correspond to 1-st and 2-nd order statistics, respectively. As a result, the Fisher vector representation is able to capture more discriminant information than traditional BOV representations.

Some embodiments, when given a set of M visual words, produce an M-dimensional BOV representation. However, for Fisher vectors, it can be seen that equations (10)-(12) lead to a $((2D+1) \times M-1)$-dimensional vector, which typically exists in a significantly higher-dimensional space than the BOV representation.

The techniques listed above (e.g., BOV, Fisher) are used to generate higher-level representations given low-level visual features (e.g., SIFT, SURF). These techniques often result in high-dimensional feature vectors, which may present significant storage or computational problems when given a large dataset. Techniques, for example PCA, LDA, and R-LDA, etc., can be used to generate a lower-dimensional representation. These techniques, embodiments of which are implemented in blocks 220 and 230, not only reduce the dimensionality of the data, but may also produce more discriminative features.

Thus, after block 210, the flow moves to block 220. In block 220, a projection matrix is generated based on the high-dimensional representations and on the labels. For example, some embodiments generate a projection matrix from one or more of a between-class scatter matrix $S_b$ (scatter between a label and other labels) and a within-class scatter matrix $S_w$ (scatter within a label), which may be calculated according to the following:

$$S_b = \frac{1}{N} \sum_{i=1}^{C} C_i (\bar{z}_i - \bar{z})(\bar{z}_i - \bar{z})^T, \text{ and} \quad (13)$$

$$S_w = \frac{1}{N} \sum_{i=1}^{C} \sum_{j=1}^{C_i} (z_{ij} - \bar{z}_i)(z_{ij} - \bar{z}_i)^T, \quad (14)$$

where $C_i$ is the number of samples in the i-th category, $\bar{z}_i$ is the mean of the i-th category, and $\bar{z}$ is the mean of the entire training set.

Next, in block 230, for each image, a lower-dimensional representation is generated based on the high-dimensional representations and on one or more of the projection matrixes. Techniques for generating the lower-dimensional representation include PCA, LDA, and R-LDA.

LDA is a supervised learning technique that uses category labels to find a set of L feature bases $\Psi = [\psi_1, \ldots, \psi_L]$ by maximizing the Fisher's discriminant criterion, which may be expressed as the ratio of the between-class and within-class scatters of training samples. Compared to traditional LDA, R-LDA attempts to optimize a regularized version of the Fisher's discriminant criterion:

$$\Psi = \operatorname*{argmax}_{\Psi} \frac{|\Psi^T S_b \Psi|}{|\eta(\Psi^T S_b \Psi) + (1-\eta)(\Psi^T S_w \Psi)|}, \quad (15)$$

where $\eta \in [0,1)$ is a regularization parameter. Given an input sample z, its R-LDA-based representation v can be obtained by a linear projection:

$$v = \Psi^T z. \quad (16)$$

In some circumstances, R-LDA has at least two advantages over traditional LDA. First, the optimal discriminant features often exist in the null space of the within-class scatter matrix $S_w$, which is difficult to estimate due to high variance. The introduction of the regularization in equation (15) helps to address this issue and enhances the generalization power of R-LDA. Second, traditional LDA needs to perform Eigen-decompositions of the between-class scatter matrix $S_b$ and the within-class scatter matrix $S_w$ in the input sample space, which could be extremely high dimensional in some cases. For example, the dimensionality of an embodiment of a Fisher vector is $((2D+1) \times M-1) = 128,999$ even when the SIFT features were compressed to be D=64 dimensional and only M=1000 Gaussian components were used. In contrast, R-LDA performs the Eigen-decompositions in the range space of the between-class scatter matrix $S_b$, which is only (C−1) dimensional. C is the number of categories, which is often much smaller than the dimensionality of the input samples. As a result, R-LDA often has significantly less computational complexity than traditional LDA.

Once the high-dimensional features have been transformed to a lower-dimensional space, for example using R-LDA or other techniques (e.g., PCA, LDA), the flow moves to block 240 where, for each category, one or more classifiers are trained based on the lower-dimensional representations, or, in some embodiments, on the high-dimensional representations, that are associated with the category. For example, some embodiments obtain a set of training data with L categories and learn L binary classifiers for each category. The L category classifiers receive the lower-dimensional representations v as inputs, and the outputs of the L category classifiers make an L-dimensional category vector. The category vector may be normalized (e.g., by L1 or L2 normalization).

For example, some embodiments use an R-LDA classifier. The R-LDA representation v generated by equation (16) is a mapping of the training images z of C categories to a lower-dimensional subspace, where each category is approximately subject to a Gaussian distribution. It may lead to a special case of the optimal Bayes classifier for a given test sample $v = \Psi^T z$, $$y = \min_i \{d_i(v)\}, \quad (17)$$

which is based on the Mahalanobis distance, $$d_i(v) = (v - \bar{v}_i)^T \Sigma_i^{-1} (v - \bar{v}_i) = (z - \bar{z}_i)^T \Psi \Sigma_i^{-1} \Psi^T (z - \bar{z}_i) \approx (z - \bar{z}_i)^T \hat{\Sigma}_i^{-1} (z - \bar{z}_i), \quad (18)$$

where $\Sigma_i$ and $\hat{\Sigma}_i$ denotes the covariance matrixes of category i in the R-LDA subspace (v) and the input space (z), respectively.

One property of the R-LDA subspace is that $\Sigma_i = I$ (identity matrix) when each category is subject to a Gaussian distribution with an identical covariance structure in the input space (i.e., $\hat{\Sigma}_i = \hat{\Sigma}$). It may be a strong assumption; however, it may work well for some difficult problems, such as face recognition. As a result, the Mahalanobis distance in the input space (z) may be approximately equivalent to the Euclidean distance in the R-LDA subspace (v), $$d_i(v) = \|v - \bar{v}_i\|_2, \quad (19)$$

where $\bar{v}_i = \Psi^T \bar{z}_i$. If the representation v is further normalized by an L2 norm, $v' = v/\|v\|_2$, the minimization of the Euclidean distance in equation (17) is equivalent to the following maximization of the cosine distance:

$$y = \max_i \{\bar{v}_i'^T v'\}. \quad (20)$$

The equivalence may lead to an efficient fusion scheme for classification and searching scores. Also, given the R-LDA representation, the classifier can be obtained through a linear projection of each category mean, $\bar{v}_i = \Psi^T \bar{z}_i$, followed by an L2 normalization, $\bar{v}_i' = \bar{v}_i / \|\bar{v}_i\|_2$.

Also for example, some embodiments use an SVM classifier. Compared to the R-LDA classifier, training an SVM classifier is more computationally expensive. From the set of training data, a binary classification task is generated for each category based on a one-vs-rest scheme. For each binary classification task, a binary linear SVM classifier may be trained according to $$\alpha_i = \omega_i^T x + \theta_i, \quad (21)$$

where x denotes a representation of an input image (e.g., representation v), $\omega_i$ denotes the category vector (e.g., the normal vector to the optimal hyperplane found by SVM learning), and $\theta_i$ determines the offset of the hyperplane from the origin along the normal vector. Given L category classifiers, a semantic label y of the input image representation x can be inferred according to $$y = \max_i \{\omega_i^T x + \theta_i\}. \quad (22)$$

For the convenience of later score fusion, the category vector $\omega_i$ and input representation x may be augmented with an additional dimension, for example according to $$\omega_i^T \leftarrow [\omega_i^T, \theta_i], x' = [x^T, 1]^T. \quad (23)$$

As a result, a simplified expression for equation (22) can be derived as follows by incorporating equation (23):

$$y = \max_i \{\omega_i^T x'\}. \quad (24)$$

From equation (20) and equation (24), it can be seen that both the R-LDA and SVM classifiers share the same form of dot product, which actually leads to the metric of cosine distance, which is widely used in image search.

Finally, in some embodiments the flow then proceeds to block 250 where, for each image, a fused representation is generated based on classifier scores for the image and the lower-dimensional representation of the image. Some embodiments use a simple concatenation of the two components. However, some embodiments combine the strengths of the components, for example to facilitate the measurement of a visual similarity between two images.

To measure visual similarity, a given query image x may be sent to multiple category classifiers and compared to multiple database images for searching and classification. Let $l_i(x)$ be the classification score of the i-th classifier, let $s(x, x_{ij})$ be the similarity score between the query image x and a database image $x_{ij}$, and let $g(x_{ij})$ be the significance score of the database image $x_{ij}$. A fused-comparison score $\kappa(x, x_{ij})$ for a pair of images $(x, x_{ij})$ may be calculated according to $$\kappa(x,x_{ij})=\lambda \cdot \gamma \cdot l_i(x)+(1-\lambda)\cdot \gamma \cdot s(x,x_{ij})+(1-\gamma)\cdot g(x_{ij}), \quad (25)$$

where $\lambda, \gamma \in [0,1]$ and $\gamma \in [0,1]$ are weighting parameters to balance the contributions from different component scores. The fused-comparison scores may implement one or more of the following priorities: an image that is more visually similar to the query image should be ranked higher; an image that is more semantically similar to the query image should be ranked higher; and an image that is more significant is generally more appealing to users, and thus it should be ranked higher.

In some embodiments, a visual similarity $s(x, x_{ij})$ is measured by direct matching between a query image and images in an image collection using metrics such as Euclidean distance, Cosine distance, or Histogram intersection distance, for example. For example some embodiments use the Cosine distance:

$$s(x, x_{ij}) = \frac{x_{ij}^T x}{\|x_{ij}\|_2 \|x\|_2}. \quad (26)$$

Also, in some embodiments a semantic similarity $l_i(x)$ is determined or estimated according to the following:

$$l_i(x)=w_i^T x, \quad (27)$$

where $w_i$ denotes the category vector (e.g., the category mean vector for an R-LDA classifier, the normal vector for an SVM classifier).

Also, some embodiments generate a significance score for the image $x_{ij}$ according to the following:

$$g(x_{ij}) = \frac{l_i(x_{ij}) - l_{i^*}(x_{ij})}{\max\{l_i(x_{ij}), l_{i^*}(x_{ij})\}}, \text{ with } i^* = \underset{k \neq i}{\mathrm{argmax}}\, l_k(x_{ij}). \quad (28)$$

This may reflect how confidently the image $x_{ij}$ is classified to be in the i-th category. In embodiments that use R-LDA classifiers, the confidence score may show how similar the image $x_{ij}$ is to the category mean.

Because the significance score of an image in the image collection may be computed in advance (e.g., offline), some embodiments that perform an online generation of a fused-comparison score $\kappa^{on}(x, x_{ij})$ do not calculate the significance score online. For example, some of these embodiments may calculate an online fused-comparison score $\kappa^{on}(x, x_{ij})$ according to $$\kappa^{on}(x,x_{ij})=\lambda \cdot l_i(x)+(1-\lambda)\cdot s(x,x_{ij}). \quad (29)$$

Prior to fusion, L2-normalization may be performed on the samples so that $\|x_{ij}\|_2=1$ and $\|x\|_2=1$. Moreover, applying equations (26) and (27) to equation (29), an online fused-comparison score $\kappa^{on}(x,x_{ij})$ may be generated according to $$\kappa^{on}(x,x_{ij})=\lambda \cdot w_i^T x+(1-\lambda)\cdot x_{ij} x=(\lambda \cdot w_i+(1-\lambda)\cdot x_{ij})^T x=\tilde{x}_{ij}^T x. \quad (30)$$

Also, a fused representation $\tilde{x}_{ij}$ of an image $x_{ij}$ (e.g., an image in the image collection) may be independent of the query image and may be computed offline, for example according to $$\tilde{x}_{ij}=\lambda \cdot w_i+(1-\lambda)\cdot x_{ij}, \quad (31)$$

where $w_i$ denotes the category vector for the classifier, and where $\lambda \in [0,1]$ and is a regularization parameter (e.g., to balance the contributions from different component scores).

Therefore, the "late" online fused-comparison score of equation (29) can be implemented by an "early" offline feature fusion followed by an online dot product. During the offline feature fusion, a fused representation $\tilde{x}_{ij}$ is generated for each database image $x_{ij}$. As a result, the online generation of the fused-comparison score $\kappa(x,x_{ij})$, based on both visual and semantic similarities, can be implemented by a dot product according to equation (30). This reduces the online computational complexity.

Thus, in some embodiments, a fused representation $\tilde{x}_{ij}$ that will facilitate the generation of a fused-comparison score is generated in block 250.

Figure 3:
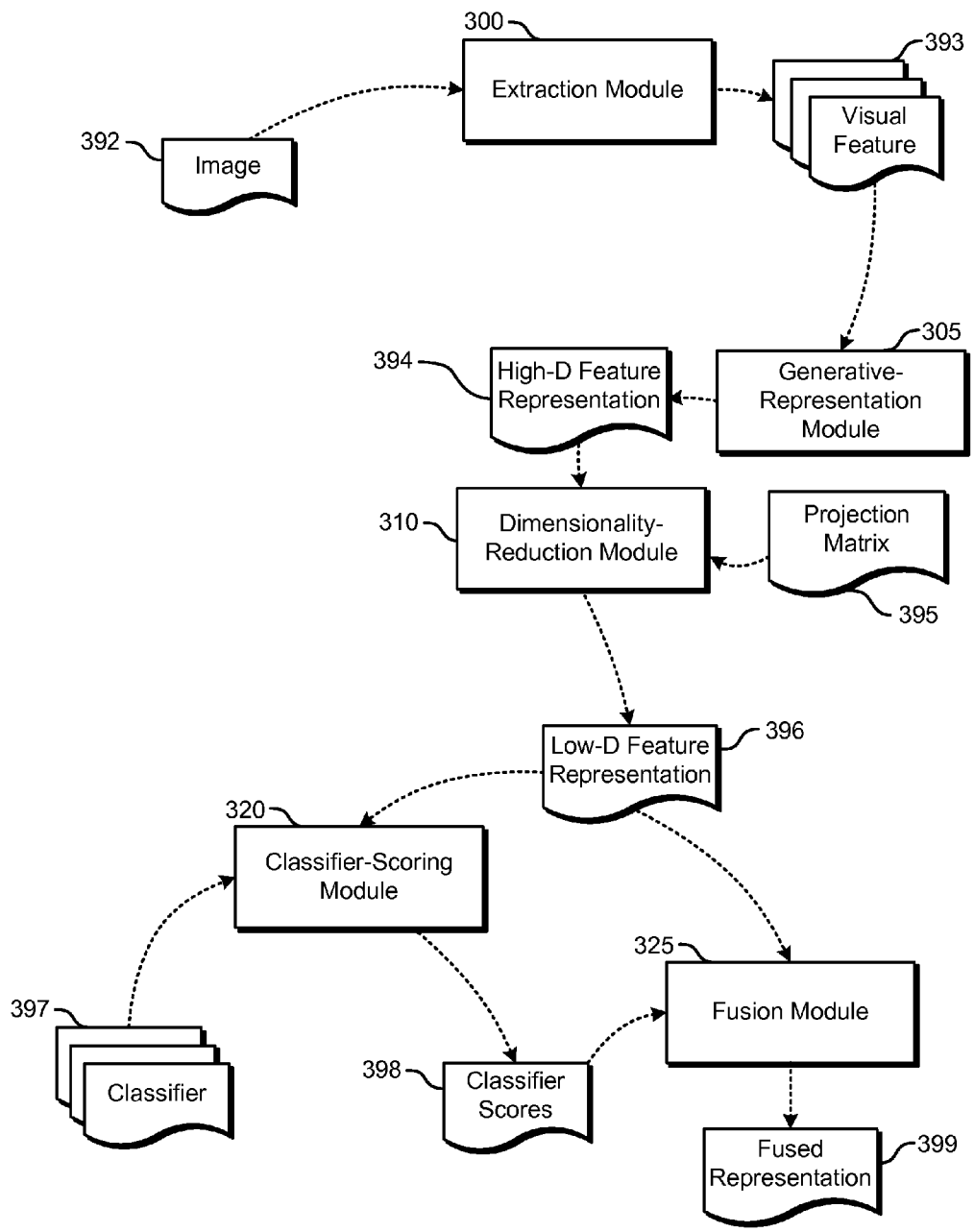
FIG. 3 illustrates an example embodiment of the operations that are performed by a system or device that generates an image representation.

FIG. 3 illustrates an example embodiment of the operations that are performed by a system or device that generates an image representation. A generative-representation module 305 obtains a set of low-level visual features 393 that were extracted from an image 392, for example by an extraction module 300. The generative-representation module 305 generates a high-dimensional image representation 394 for the image 392 from the obtained low-level visual features 393. Next, the high-dimensional image representations 394 are sent to a dimensionality-reduction module 310, which generates a lower-dimensional image representation 396 for the image 392. The dimensionality-reduction module 310 may use a projection matrix 395 to generate the lower-dimensional image representation 396.

The lower-dimensional representation 396 is obtained by a classifier-scoring module 320, which generates classifier scores 398 based on the lower-dimensional representation 396 and a set of classifiers 397. Also, a fusion module 325 generates a fused representation 399 based on the classifier scores 398 and the lower-dimensional image representation 396, for example according to equation (25).

Figure 4:
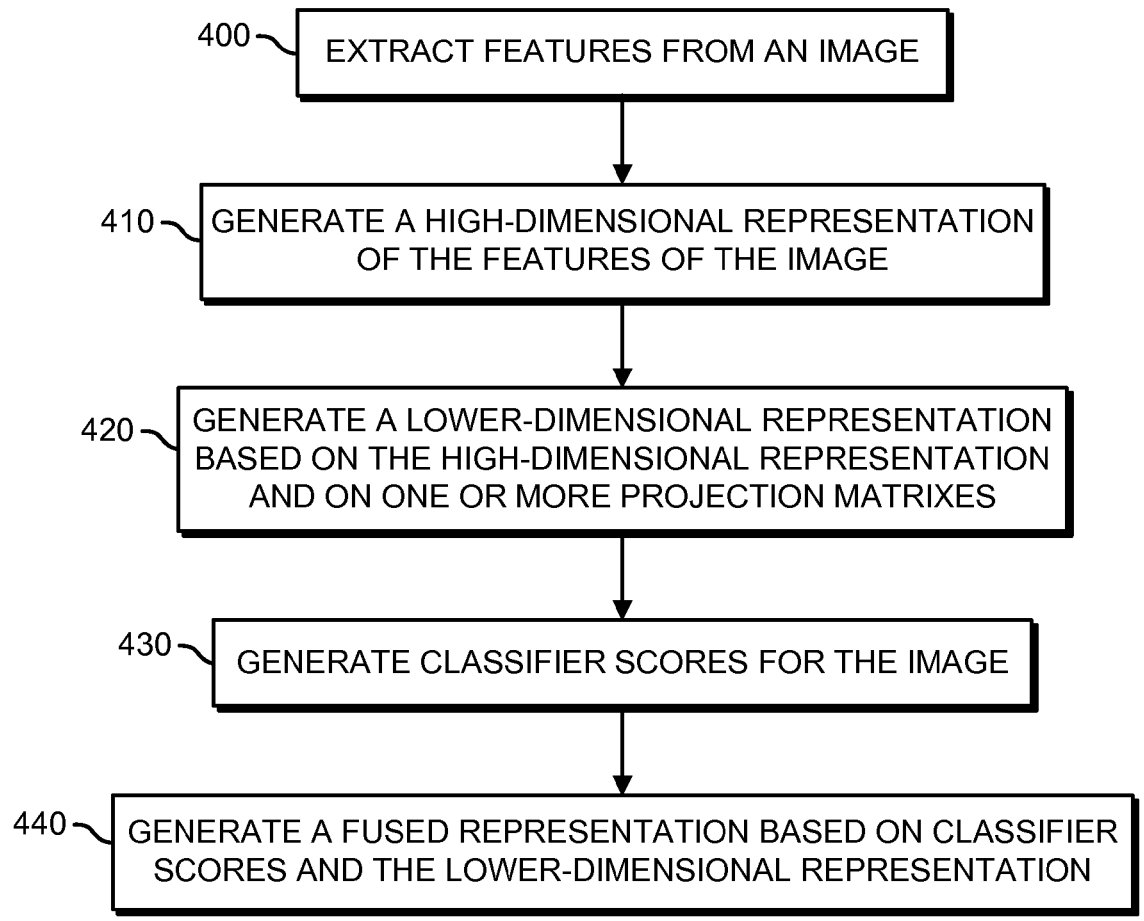
FIG. 4 illustrates an example embodiment of an operational flow for generating a fused representation.

FIG. 4 illustrates an example embodiment of an operational flow for generating a trained fused-representation system. In block 400, features are extracted from an image. The flow then proceeds to block 410, where a high-dimensional representation of the features of the image is generated. The flow then moves to block 420. In block 420, a lower-dimensional representation is generated based on the high-dimensional representation and on one or more projection matrixes. Next, in block 430, classifier scores are generated for the image based on the classifiers in a set of classifiers and the lower-dimensional representation or the high-dimensional representation. For example, some classifiers may use the lower-dimensional image representation as in input, and some classifiers may use the high-dimensional image representation as an input. Finally, in block 440 a fused representation is generated based on the classifier scores and the lower-dimensional representation or, in some embodiments, on the high-dimensional representation.

Figure 5:
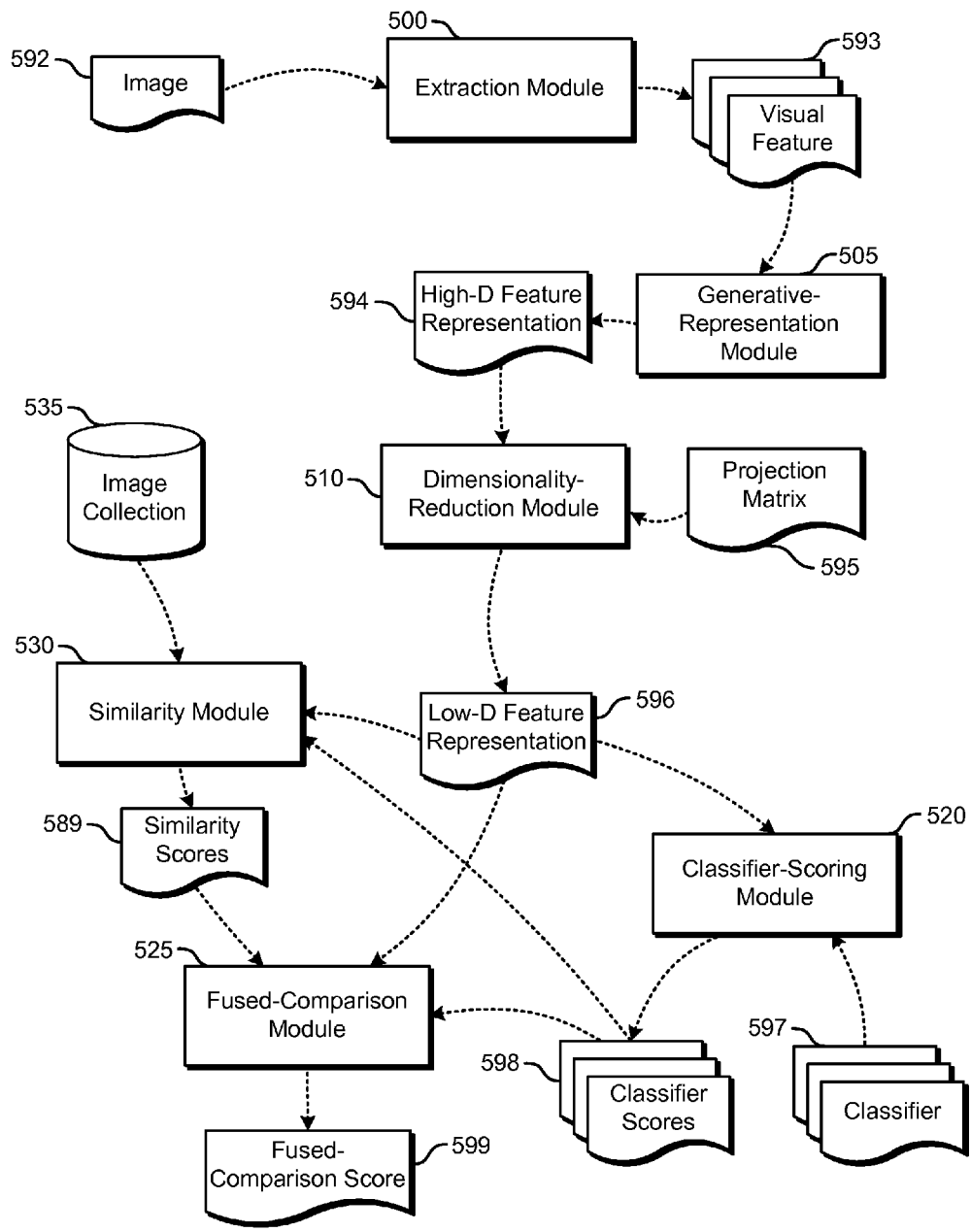
FIG. 5 illustrates an example embodiment of the operations that are performed by a system or device that generates a fused-comparison score.

FIG. 5 illustrates an example embodiment of the operations that are performed by a system or device that generates a fused-representation comparison. An extraction module 500 extracts visual features 593 from an image 592. A generative-representation module 505 obtains the visual features 593 and generates a high-dimensional image representation 594 for the image 592 based on the visual features 593. Next, the high-dimensional image representation 594 is sent to a dimensionality-reduction module 510, which generates a lower-dimensional image representation 596 for the image 592. The dimensionality-reduction module 510 may use a projection matrix 595 to generate the lower-dimensional image representation 596.

The lower-dimensional representation 596 is obtained by a classifier-scoring module 520, which generates classifier scores 598 based on the lower-dimensional representation 596 and a set of classifiers 597. Also, the lower-dimensional representation 596 or the classifier scores 598 are obtained by a similarity module 530, which generates similarity scores 589 that indicate respective similarities (e.g., visual similarities, semantic similarities) between the lower-dimensional representation 596 and the lower-dimensional representations of other images $x_{ij}$ in an image collection 535. The image collection 535 stores lower-dimensional representations or fused representations $\tilde{x}_{ij}$ for the images $x_{ij}$ in the image collection 535. Also, the classifiers 597 were trained based on the categories of the images $x_{ij}$ in the image collection 535.

A fusion-comparison module 525 generates a fused-comparison score 599 based on the classifier scores 598 and the similarity scores 589. For example, a fused comparison score $(x, x_{ij})$ 599 for a pair of images $(x, x_{ij})$ may be calculated according to equation (25), equation (29), or equation (30).

Figure 6:
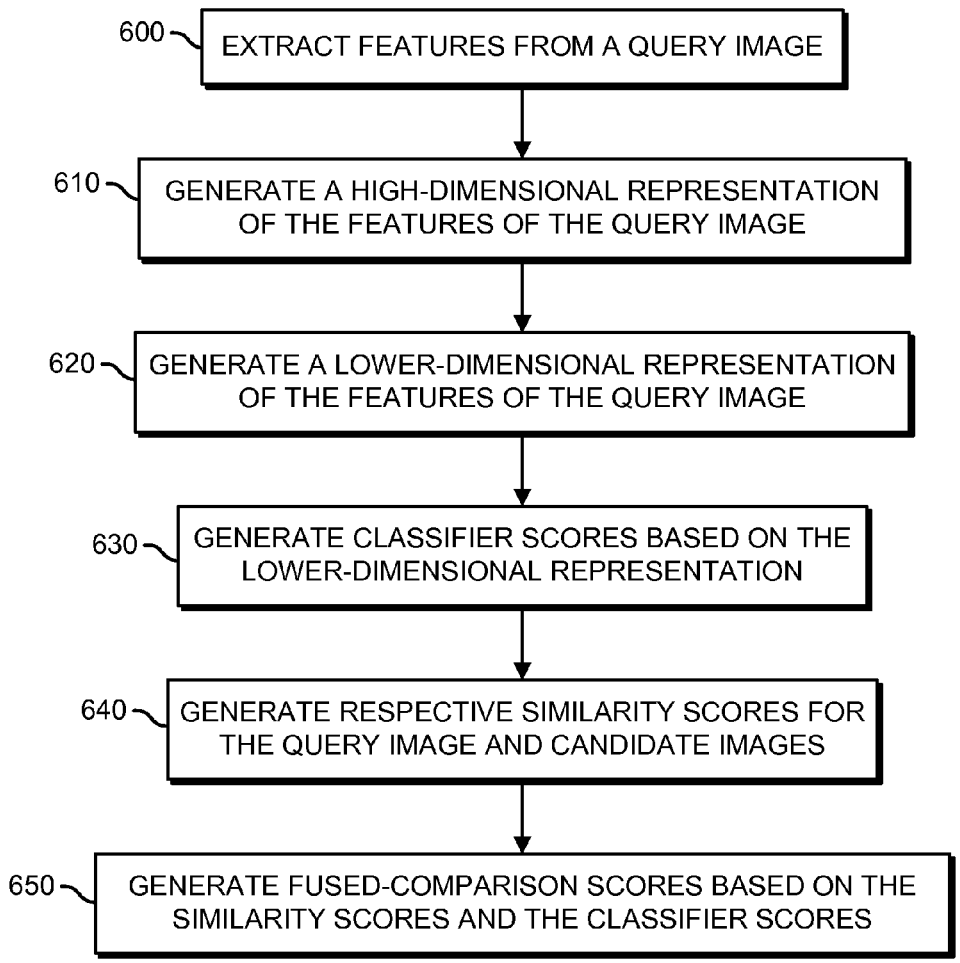
FIG. 6 illustrates an example embodiment of an operational flow for generating fused-comparison scores.

FIG. 6 illustrates an example embodiment of an operational flow for generating fused-comparison scores. In block 600, features are extracted from a query image. Next, in block 610, a high-dimensional representation of the features of the query image is generated. The flow then moves to block 620, where a lower-dimensional representation of the features of the query image is generated. The flow proceeds to block 630, where classifier scores are generated based on the lower-dimensional representation (or the high-dimensional representation, in some embodiments). Next, in block 640, respective similarity scores are generated for the query image and one or more candidate images. Finally, in block 650, fused-comparison scores are generated based on the similarity scores and the classifier scores.

Figure 7:
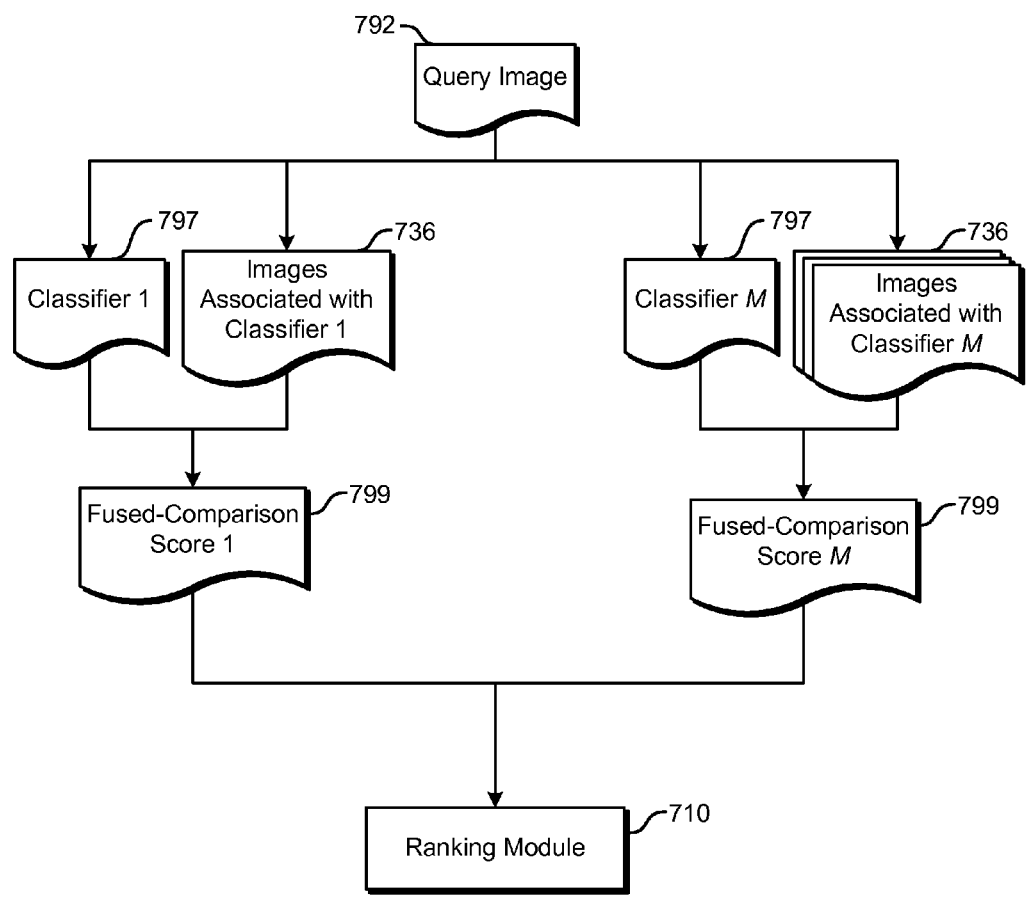
FIG. 7 illustrates an example embodiment of an operational flow for evaluating fused-comparison scores.

FIG. 7 illustrates an example embodiment of an operational flow for evaluating fused-comparison scores. A query image 792, or a high-dimensional representation or a lower-dimensional representation of the query image 792, is input to a category's classifier 797 and compared with the one or more images 736 that are associated with the category of the classifier. A fused-comparison score 799 is generated from the output of the classifier 797 and the results of the comparisons with the images 736 that are associated with the category of the classifier. For example, a lower-dimensional representation of the query image 792 may be input to classifier 1 797 and compared to the one or more images 736 (e.g., respective lower-dimensional representations of the images) that are associated with the category of classifier 1 797. Then fused-comparison score 1 799 is generated from the output of classifier 1 797 and the results of the comparisons with the one or more images 736 that are associated with the category of classifier 1 797. If multiple images are associated with classifier 1 797, then the query image 792 may be compared to each of the images 736, and fused-comparison score 1 799 will be generated based on the comparisons. In some embodiments, the query image 792 is compared to a sub-set of the images 736 that are associated with the class category. For example, a search indexing scheme may be used to reduce the number of image comparisons. Finally, in the ranking module 710, the images 736 that are associated with the classifiers 797 are ranked based on the fused-comparison scores 799.

Figure 8:
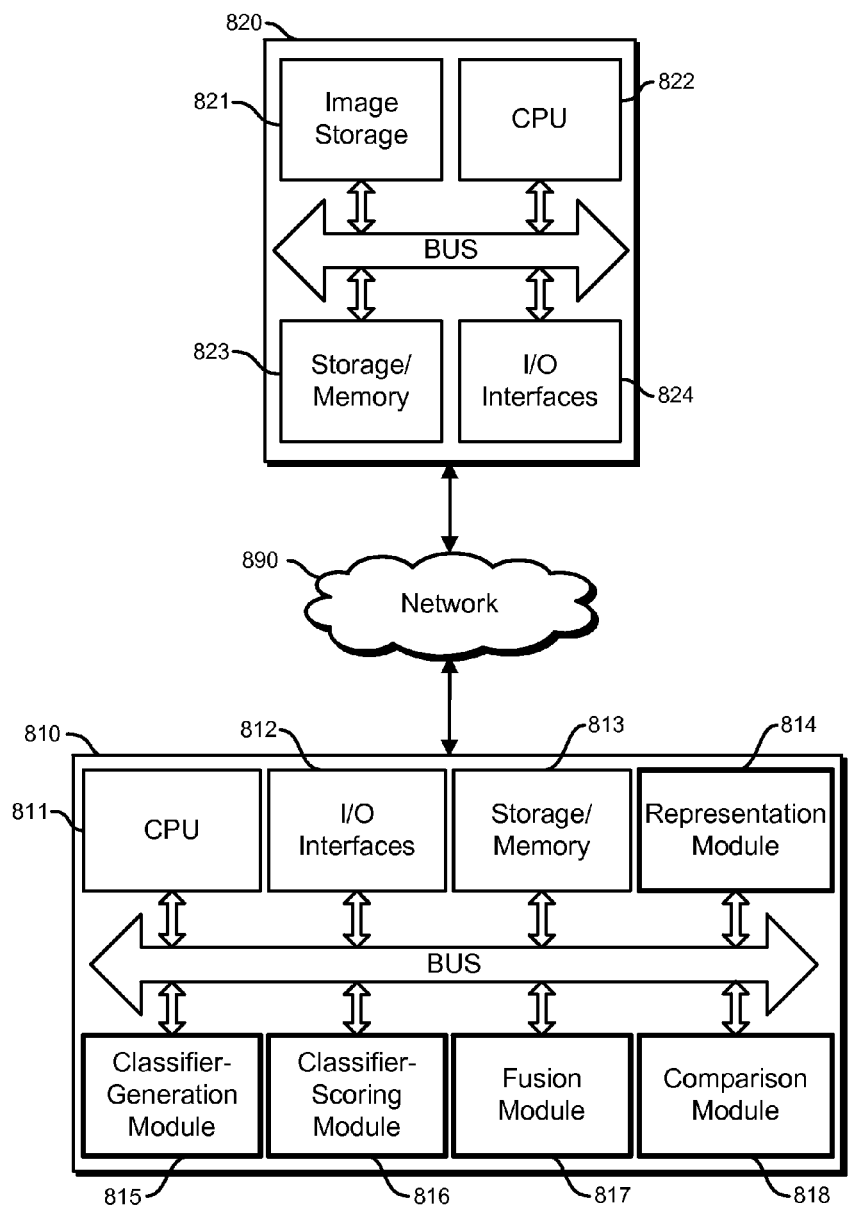
FIG. 8 illustrates an example embodiment of a system for generating fused representations.

FIG. 8 illustrates an example embodiment of a system for generating fused representations. The system includes a representation-generation device 810 and an image-storage device 820. The representation-generation device 810 includes one or more processors (CPU) 811, I/O interfaces 812, and storage/memory 813. The CPU 811 includes one or more central processing units, which include microprocessors (e.g., a single core microprocessor, a multi-core microprocessor) or other circuits, and is configured to read and perform computer-executable instructions, such as instructions stored in storage or in memory (e.g., in modules that are stored in storage or memory). The computer-executable instructions may include those for the performance of the operations described herein. The I/O interfaces 812 include communication interfaces to input and output devices, which may include a keyboard, a display, a mouse, a printing device, a touch screen, a light pen, an optical-storage device, a scanner, a microphone, a camera, a drive, and a network (either wired or wireless).

The storage/memory 813 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 813 is configured to store computer-readable data or computer-executable instructions. The components of the representation-generation device 810 communicate via a bus.

The representation-generation device 810 also includes a representation module 814, a classifier-generation module 815, a classifier-scoring module 816, a fusion module 817, and a comparison module 818. In some embodiments, the representation-generation device 810 includes additional or fewer modules, the modules are combined into fewer modules, or the modules are divided into more modules. The representation module 814 includes computer-readable instructions that, when executed, cause one or more computing devices to implement the functionality of the extraction modules, the generative-representation modules, and the dimensionality-reduction modules in FIGS. 1, 3, and 5. The classifier-generation module 815 includes computer-readable instructions that, when executed, cause one or more computing devices to implement the functionality of the classifier-generation module 115 in FIG. 1. The classifier-scoring module 816 includes computer-readable instructions that, when executed, cause one or more computing devices to implement the functionality of the classifier-scoring modules in FIGS. 1, 3, and 5. The fusion module 817 includes computer-readable instructions that, when executed, cause one or more computing devices to implement the functionality of the fusion modules in FIGS. 1 and 3. Also, the comparison module 818 includes computer-readable instructions that, when executed, cause one or more computing devices to implement the functionality of the similarity module 530 and the fused-comparison module 525 of FIG. 5.

The image-storage device 820 includes a CPU 822, storage/memory 823, I/O interfaces 824, and image storage 821. The image storage 821 includes one or more computer-readable media that are configured to store images. The image-storage device 820 and the representation-generation device 810 communicate via a network 890. In some embodiments, the original images may not be stored on the image storage device. In these embodiments, the image-storage device 820 may store image metadata, low-level image features, image thumbnails, or high-dimensional image representations, for example.

Figure 9A:
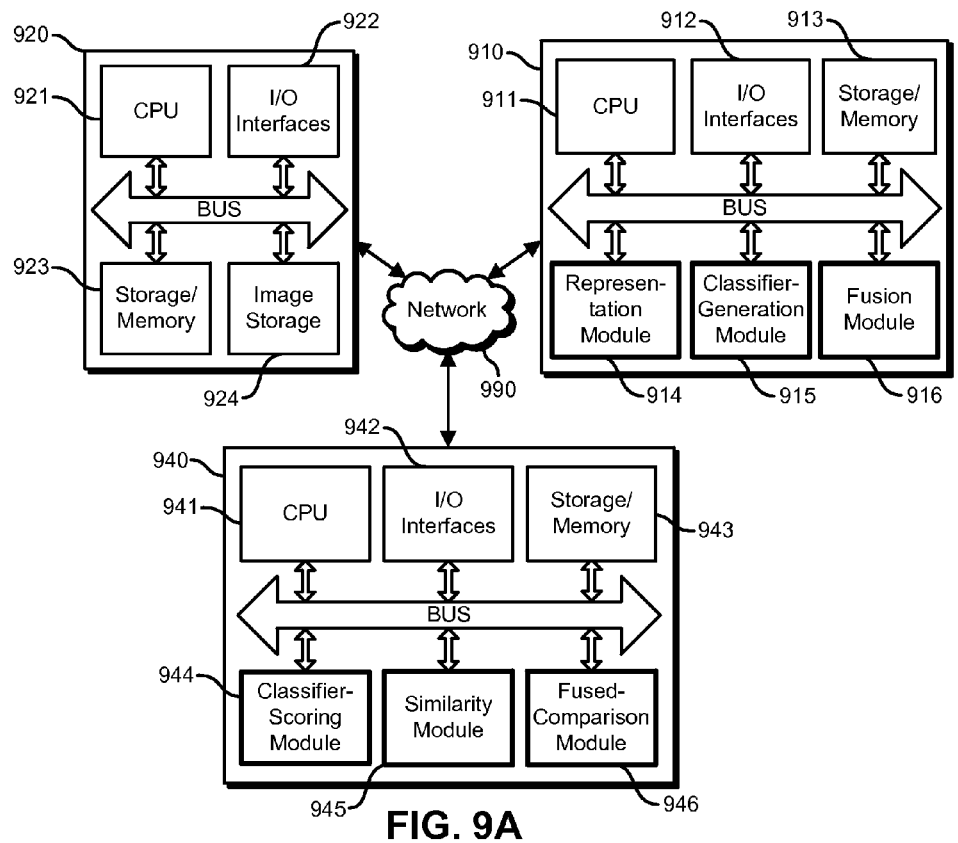
FIG. 9A illustrates an example embodiment of a system for generating fused representations.

FIG. 9A illustrates an example embodiment of a system for generating fused representations. The system includes an image-storage device 920, a fused-representation-generation device 910, and a fused-comparison device 940, which communicate via a network 990. The image-storage device 920 includes one or more CPUs 921, I/O interfaces 922, storage/memory 923, and image storage 924. The fused-representation-generation device 910 includes one or more CPUs 911, I/O interfaces 912, storage/memory 913, a representation module 914, a classifier-generation module 915, and a fusion module 916. The fused-comparison device 940 includes one or more CPUs 941, I/O interfaces 942, storage/memory 943, a classifier-scoring module 944, a similarity module 945, and a fused-comparison module 946.

Figure 9B:
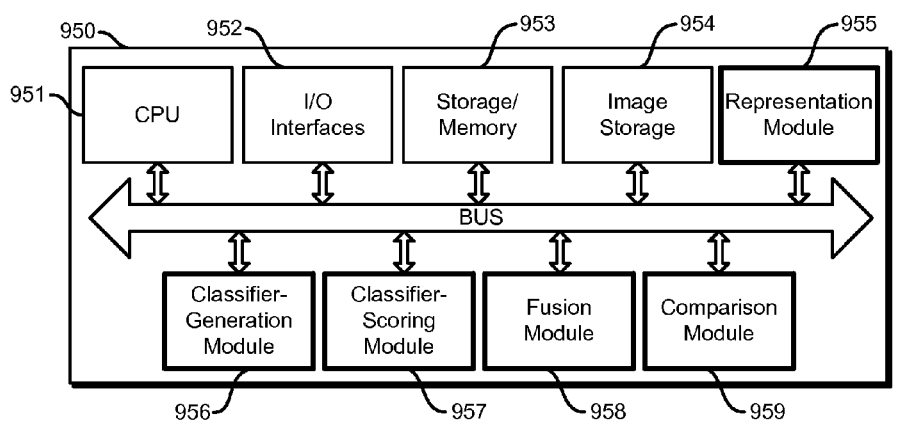
FIG. 9B illustrates an example embodiment of a system for generating fused representations.

FIG. 9B illustrates an example embodiment of a system for generating fused representations. The system includes a fused-representation-generation device 950. The fused-representation-generation device 950 includes one or more CPUs 951, I/O interfaces 952, storage/memory 953, an image-storage module 954, a representation module 955, a classifier-generation module 956, a classifier-scoring module 957, a fusion module 958, and a comparison module 959. Thus, in this example embodiment of the representation-generation device 950, a single device performs all the operations and stores all the applicable information.

The above-described devices, systems, and methods can be implemented by providing one or more computer-readable media that contain computer-executable instructions for realizing the above-described operations to one or more computing devices that are configured to read and execute the computer-executable instructions. Thus, the systems or devices perform the operations of the above-described embodiments when executing the computer-executable instructions. Also, an operating system on the one or more systems or devices may implement at least some of the operations of the above-described embodiments. Thus, the computer-executable instructions or the one or more computer-readable media that contain the computer-executable instructions constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method comprising:
   obtaining a set of low-level features from each image in a set of images, wherein each image is associated with one or more labels in a set of labels;
   generating a respective high-dimensional generative representation of each image based on the low-level features;
   generating a respective lower-dimensional representation of each image based on the respective high-dimensional generative representation of the image;
   generating respective classifiers for each label in the set of labels based on one or more of the high-dimensional generative representations of the images that are associate with the label and the lower-dimensional representations of the images that are associated with the label; and
   generating a respective combined representation for each image, wherein the combined representation includes the respective classifiers of the labels that are associated with the respective image and includes the lower-dimensional representation of the respective image, and wherein the respective combined representation for an image is generated according to $$\tilde{x}_{ij} = \lambda \cdot w_i + (1-\lambda) \cdot x_{ij},$$

where $x_{ij}$ denotes the lower-dimensional representation of the image, where $\tilde{x}_{ij}$ denotes the respective combined representation of the image, where $w_i$ denotes the respective classifiers of the labels that are associated with the image, and where $\lambda$ is a regularization parameter.

2. The method of claim 1, wherein the higher-dimensional generative representation is generated with a Fisher-vector technique or a bag-of-visual-features technique.

3. The method of claim 1, wherein the lower-level representation is a discriminant representation that is generated using regularized linear-discriminant analysis.

4. The method of claim 1, wherein the combined representations are generated using vector addition.

5. A method comprising:
   obtaining a query image;
   generating a high-dimensional generative representation of low-level features the query image;
   generating a lower-dimensional representation of the low-level features of the query image based on the high-dimensional generative representation; and
   generating a comparison score for the query image and a reference image based on the lower-dimensional representation of the query image and on a combined representation of the reference image, wherein the combined representation of the reference image includes one or more classifiers and a lower-dimensional representation of the reference image, and wherein the combined representation of the reference image was generated according to $$\tilde{x}_{ij} = \lambda \cdot w_i + (1-\lambda) \cdot x_{ij},$$

where $x_{ij}$ is the lower-dimensional representation of the reference image, where $w_i$ is a respective classifier of a label that is associated with the reference image, and where $\lambda$ is a weighting parameter.

6. The method of claim 5, wherein the one or more classifiers include a category vector.

7. The method of claim 5, wherein the comparison score can be described according to $$\kappa^{on}(x, x_{ij}) = \lambda \cdot l_i(x) + (1-\lambda) \cdot s(x, x_{ij}),$$

where x is the lower-dimensional representation of the query image, where $\kappa^{on}(x, x_{ij})$ is the comparison score, where $s(x, x_{ij})$ is a matching score between the lower-dimensional representation of the query image x and the lower-dimensional representation of the reference image $x_{ij}$, where $l_i(x)$ is a classifier output, and where $\lambda$ is a weighting parameter.

8. The method of claim 7, wherein the matching score is a cosine distance, where $s(x, x_{ij}) = x_{ij}^T x$, and where the lower-dimensional representation of the the query image x and the lower-demensional representation of the reference image $x_{ij}$ have been pre-normalized by L2-normalization.

9. The method of claim 5, wherein the comparison score is generated by a dot-product operation.

10. The method of claim 5, wherein the comparison score is further based on a significance of the reference image, and wherein the significance of the reference image is a classification confidence $g(x_{ij})$ that can be computed according to $$g(x_{ij}) = \frac{l_i(x_{ij}) - l_{i^*}(x_{ij})}{\max\{l_i(x_{ij}), l_{i^*}(x_{ij})\}}, \text{ with } i^* = \underset{k \neq i}{\operatorname{argmax}} l_k(x_{ij}).$$

11. The method of claim 10, wherein the comparison score $\kappa(x, x_{ij})$ can be described according to $$\kappa(x, x_{ij}) = \lambda \cdot \kappa^{on}(x, x_{ij}) + (1-\lambda) \cdot g(x_{ij}),$$

where $\kappa^{on}(x, x_{ij})$ is a function that compares the lower-dimensional reprentation of the query image to the combined representation of the reference image, where $g(x_{ij})$ is the classification confidence, and where $\gamma$ is a weighting parameter.

12. One or more computer-readable storage media storing instructions that, when executed by one or more computing devices, cause the one or more computing devices to perform operations comprising:
  obtaining low-level features from each image in a set of images, wherein each image is associated with one or more labels in a set of labels;
  generating a high-dimensional representation for each image based on the low-level features of the respective image;
  generating a lower-dimensional representation for each image based on the high-dimensional representation of the respective image;
  generating a classifier for each label in the set of labels based on the high-dimensional representations of the respective images that are associated with the label or the lower-dimensional representations of the respective images that are associated with the label; and
  generating a respective combined representation for each image, wherein the respective combined representation of an image includes the respective classifiers of the one or more labels that are associated with the respective image and includes the lower-dimensional representation of the respective image, and wherein the respective combined representation for an image is generated according to $$\tilde{x}_{ij} = \lambda \cdot w_i + (1-\lambda) \cdot x_{ij},$$

where $x_{ij}$ denotes the lower-dimensional representation of the image, where $\tilde{x}_{ij}$ denotes the respective combined representation of the image, where $w_i$ denotes the respective classifiers of the labels that are associated with the image and where $\lambda$ is a regularization parameter.

13. The method of claim 12, wherein the high-dimensional representations include a Fisher vector or a bag of visual features.

14. The method of claim 12, wherein the lower-dimensional representations are generated using regularized linear-discriminant analysis.

15. The method of claim 6, wherein the category vector is a category mean vector of an LDA classifier or is a normal vector of an SVM classifier.

16. The method of claim 9, wherein the comparison score is generated according to $$\kappa^{on}(x, x_{ij}) = \tilde{x}_{ij}^T x,$$

where $\tilde{x}_{ij}$ is the combined representation of the reference image and where x is the query image.

* * * * *